L. C. RENARD & C. M. de La HAYE.
Pneumatic Grain Conveyer.
No. 219,019. Patented Aug. 26, 1879.
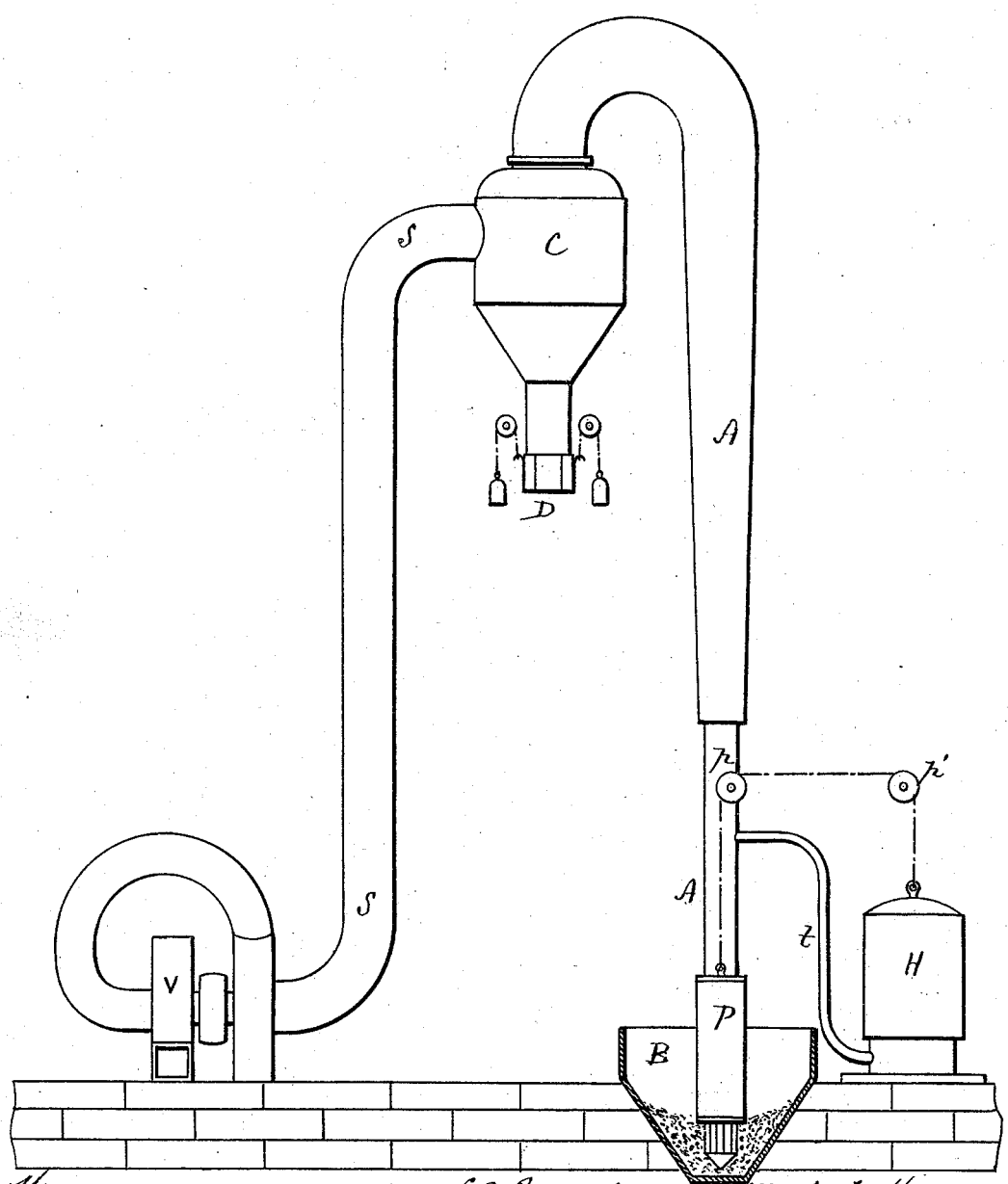

UNITED STATES PATENT OFFICE.

LOUIS C. RENARD AND CHARLES M. DE LA HAYE, OF MENDON VILLAGE, NEAR PARIS, FRANCE.

IMPROVEMENT IN PNEUMATIC GRAIN-CONVEYERS.

Specification forming part of Letters Patent No. 219,019, dated August 26, 1879; application filed July 12, 1878; patented in France, March 3, 1877.

*To all whom it may concern:*

Be it known that we, LOUIS CHAS. RENARD and CHAS. M. DE LA HAYE, of Paris, France, have invented a new Improvement in Atmospheric Elevators for Grain, &c.; and we do hereby declare the following, when taken in connection with the accompanying drawing and the letters of reference marked thereon, to be a full, clear, and exact description of the same, and which said drawing constitutes part of this specification and represents a side view.

This invention relates to the employment of a forced atmospheric pressure to raise grain or other substances from a low point to a higher as a substitute for elevators now used for grain, but applicable to raising, in like manner, other materials; and the invention consists in combining with an elevating-tube an atmospheric blower or pump to create an upward blast or current within said tube sufficient to take up the grain, or whatever it may be, that surrounds the lower end of said tube.

As represented in the accompanying illustration, which shows one practical method of carrying out this invention, A represents the elevator-tube. This may be of equal or increasing diameter, its lower end opening into the mass of grain, or whatever it may be, to be raised. C is a separator, into the top of which the upper end of the tube A opens, and at the bottom of the separator C is a regulated opening, D, for the discharge of the material raised. S is the air-tube leading from the upper part of the separator C to the blower V.

The operation of this elevator is as follows: The blower, being set in motion, draws air with great force through the tubes A and S, and the lower end of the tube A being immersed in the grain or material to be raised, the grain will pass with the air up the tube A and into the separator C, where it will fall, while the current of air continues on to the blower, the grain passing out through the opening D. This opening, it will be understood, is automatically regulated, so that when there is grain to discharge it may pass out, but the admission of air prevented.

Instead of applying the blower to draw air and grain through the tube A it may be applied to force an upward blast through the tube A and produce the same result.

Instead of the separator C a branch tube may be applied to the elevator-tube—say, near the discharge or near the downward bend or turn of that tube—and this branch lead to the blower. In this case the blower will take the air, while the grain will continue under the momentum it has attained. It will be understood that any suitable blowing or pumping apparatus may be applied.

To regulate the quantity of air admitted to the elevator-tube, and which must vary with different grains or materials to be raised, a sleeve, P, is arranged upon the lower or inlet end of the tube A, and so as to be raised from or lowered over the openings in the tube A. This is suspended over pulleys P P' and counterbalanced by a regulator, H. This regulator is a cylinder closed at its upper end and fitting closely an interior cylinder, so as to form an air-chamber within the two, and from the interior of these cylinders a small tube, $t$, leads into the tube A above the sleeve P.

Now, if the requisite quantity of air is supplied at the mouth of the tube A, then the sleeve P and the cylinder H remain stationary; but if there be not air enough admitted to the mouth of the tube A, then it will be drawn from below the cylinder H, causing that to fall and raise the sleeve P to enlarge the mouth. On the contrary, if too great a quantity be admitted the force beneath the cylinder H will be increased from the tube A, raising the cylinder H and lowering the sleeve P to reduce the opening in the tube A.

The air supplied to produce the blast or draft may be heated so as to dry the material being raised, if desired.

The blast or current of air will take the dust from the grain in its passage, the dust passing onto the blower or to the point where the air is discharged.

I claim—

1. The combination of the elevating-tube, its lower end opening into the grain or material to be raised, the other opened above for discharge, and an upward or forced blast or draft of air admitted to said tube between its inlet and discharge, a separator to receive the discharge from the elevator-tube, and from which the blast or draft is made, and with an automatically-regulated discharge, D, from said separation, substantially as described.

2. The combination of the elevating tube, its lower end opening into the grain or material to be raised, the other opened above for discharge, and an upward or forced blast or draft of air admitted to said tube between its inlet and discharge, and a regulator for increasing or reducing the inlet to the elevator-tube, substantially as described.

In testimony whereof we have signed our names to this specification before two subscribing witnesses.

L. C. RENARD.
C. M. DE LA HAYE.

Witnesses:
ROBT. M. HOOPER,
J. ARMENGAUD, Jeune.